(12) United States Patent
Kong (10) Patent No.: US 8,925,487 B2
(45) Date of Patent: Jan. 6, 2015

(54) CONTAINER EQUIPPED WITH DRY-TYPE FILTERING APPARATUS FOR TRANSPORTING LIVE FISH

(75) Inventor: Kyung Suk Kong, Busan (KR)

(73) Assignees: Daeil Co., Ltd., Busan (KR); Kyung Suk Kong, Busan (KR)

( * ) Notice: Subject to any disclaimer, the term of this patent is extended or adjusted under 35 U.S.C. 154(b) by 435 days.

(21) Appl. No.: 13/381,910

(22) PCT Filed: Jul. 2, 2010

(86) PCT No.: PCT/KR2010/004309
§ 371 (c)(1),
(2), (4) Date: Dec. 31, 2011

(87) PCT Pub. No.: WO2011/002257
PCT Pub. Date: Jan. 6, 2011

(65) Prior Publication Data
US 2012/0103271 A1 May 3, 2012

(30) Foreign Application Priority Data
Jul. 2, 2009 (KR) .......................... 10-2009-0060406

(51) Int. Cl.
*A01K 63/02* (2006.01)
(52) U.S. Cl.
USPC .......................................................... 119/203
(58) Field of Classification Search
CPC .......... B65D 88/12; A01K 63/02; A01K 63/06
USPC .................. 119/201–203, 259–261
See application file for complete search history.

(56) References Cited

U.S. PATENT DOCUMENTS

| 5,572,952 | A | * | 11/1996 | Manome | 119/203 |
| 7,523,718 | B2 | * | 4/2009 | Torring et al. | 119/203 |
| 8,485,132 | B2 | * | 7/2013 | Kong | 119/226 |
| 8,505,489 | B2 | * | 8/2013 | Lyngstad | 119/203 |
| 2004/0118359 | A1 | * | 6/2004 | Badell | 119/203 |
| 2005/0076848 | A1 | | 4/2005 | Lyngstad | |
| 2014/0020414 | A1 | * | 1/2014 | Rusignuolo et al. | 62/115 |

FOREIGN PATENT DOCUMENTS

| JP | 03111285 A | * | 5/1991 | ............ B65D 88/12 |
| JP | 04200334 A | * | 7/1992 | ............ A01K 63/02 |
| JP | 05-168371 A | | 7/1993 | |
| JP | 2005172396 A | * | 6/2005 | ............ F25D 11/00 |
| KR | 20-1999-0007751 U | | 2/1999 | |
| KR | 10-2001-0109247 A | | 12/2001 | |
| KR | 10-2003-0019278 | | 3/2003 | |
| KR | 10-2006-0012142 A | | 2/2006 | |
| KR | 2010012017 | * | 2/2010 | |

* cited by examiner

*Primary Examiner* — Kimberly Berona
(74) *Attorney, Agent, or Firm* — Novick, Kim & Lee, PLLC; Jae Youn Kim (57) ABSTRACT

The present invention relates to a container equipped with a dry-type filtering apparatus for transporting live fish, wherein the dry-type filtering apparatus, which can be applied together with an existing wet-type filtering tank or independently, is installed on the upper, side portions of the fish tank to filter the water stored in the tank. The container according to the present invention also enables the culturing of filter microorganisms in a filter medium of the dry-type filtering apparatus to remove the ammonia content contained in the water, thereby enabling purification and improvement of the quality of the water without limitations on the weight of the container.

8 Claims, 4 Drawing Sheets

Fig 4

CONTAINER EQUIPPED WITH DRY-TYPE FILTERING APPARATUS FOR TRANSPORTING LIVE FISH

TECHNICAL FIELD

The present invention relates generally to a live fish container to be used for importation/exportation and inland transportation of live fish as freezer container. More particularly, the present invention relates to a container equipped with a dry-type filtering apparatus for transporting live fish, wherein the dry-type filtering apparatus, which can be applied together with an existing wet-type filtering tank or independently, is installed on the upper, side portions of the fish tank to filter the water stored in the tank. The container according to the present invention also enables the culturing of filter microorganisms in a filter medium of the dry-type filtering apparatus to remove the ammonia content contained in the water, thereby enabling purification and improvement of the quality of the water without limitations on the weight of the container. A sufficiently large space can also be secured to be occupied by the live fish water tank within the space of a limited cargo room so that the amount of live fish to be carried can be increased; and disease or death of the live fish can prevented in advance by removing harmful content, thereby enabling the transportation period and transportation distance for the live fish obtained by the live fish container to be maximized.

BACKGROUND ART

Generally, containers to be used for importation/exportation goods may be classified into 20 feet-type and 40 feet-type. In the case of 20 feet-type, live load including the weight of container is not greater than 24 ton. In the case of 40 feet-type, live load including the weight of container is not greater than 30 ton. This fact is limited to the application of International Standard with respect to importation/exportation goods. Alternatively, containers to be used for importation/exportation goods may be classified into a dry-type container for transporting general goods, a ceiling open-type container for conveniently loading or unloading goods, and a freeze-type container for transporting frozen goods or cold-storage goods.

The freeze-type container generally employs a refrigerating unit for setting a desired cooling temperature with respect to loading goods. Accordingly this freeze-type container may be further classified into an internal-type container and an external-type container in accordance with installation of the refrigerating unit. Internal temperature of cargo room may be controlled in the range of +26° C.~−28° C. due to the operation of refrigerating unit.

Meanwhile, it is required to have an electric power source for operating the refrigerating unit. For this purpose, an electric apparatus for applying and storing an electric source generated from a power source of a trailer or a container ship is also installed in the freezer container together with the refrigerating unit. Since it is necessary to have some special devices in the freezer container, the freezer container is loaded in a freezer container space defined within the container ship.

The consumption of live fish has lately grown due to the increase of the consumers' desire according to the development in food service industry and a larger increase in national income. The output of live fish farmed and caught from the coastal waters is beyond the amount of consumption of home consumers preferring live fresh seafood. Since logistics costs for transporting live fish from a live fish producing district to the consumer is too high, purchase price of live fish is highly increased.

In the case of transporting live fish from the live fish producing district to the consumer under the room temperature condition, the percentage rate of live fish to seawater to be charged into a live fish container is 15%:85%. Since the number of live fish is high and it is hard to survive live fish by 24 hours in the course of transporting, the live fish may be transported for a relatively short distance. For transporting live fish over exceedingly long distances and from one country to another, logistics costs for transporting live fish is too high.

In view of the foregoing, a variety of endeavors for developing a live fish transporting container having advantages of the freezer container above have been proposed. It is important, therefore, that an improved live fish container can provide safe transportation of the young of fishes or aquarium fishes over long distances for a long time and can perform a large-scale transportation of live fish with a low logistic cost. This leads to the economical importation of live fish from a country with less consumption of live fish and leads to the prosperous exportation of the competitive domestic live fish.

For example, an improved container as described above generally comprises a live fish water tank installed in a cargo room having a door, a wet-type filtering tank, an oxygen-supply means, a circulation pump of the water and a controller, etc. A cooling device is installed at a rear side of the cargo room. This cooling device may be formed by remodeling a cooling unit of a conventional driving part in the freezer container to be suited to cool live fish. The water can be circulated from the live fish water tank to the wet-type filtering tank due to the operation of the circulation pump. At this time, the temperature of the water stored in the live fish water tank can be lowered at 5° C. by operating the cooling device, this leads to minimize the metabolic rate and the oxygen consumption rate of live fish. And incidentally, it is possible to transport live fish over short distances for a short time in a state that the water has a relatively low weight equivalent to four times with respect to the weight of live fish.

Meanwhile, the wet-type filtering tank installed in the live fish container generally includes filter media such as sand, gravel, non-woven fabric or sponge and so on by laminating them on a bottom of the live fish tank; and a filtering tank including filter media as such, which is installed at the outside of the live fish tank. The water may be filtered and purified by bacteria cultured in the filter media by making it flow through the filter media.

See for example, Korean Patent publication No. 10-2003-0019278 laid-open to the public on Mar. 6, 2003, which disclose a container for importing/exporting live fish having filtering apparatus. According to this patent application, functional filling materials such as red clay or elvan (germanium) are applied to the filter media so as to enhance the sterilizing power and the cleansing power. In addition, filling materials such as activated carbon (charcoal) is added to the filter media so as to improve the capability for purifying the live fish water.

If the wet-type filtering tank is independently used in the live fish container, the filter media must be deposited in the live fish water or additional large filtering tank must be installed. In this case, the total weight of the live fish filtering tank including the filter media is too great, thereby resulting in the excessive weight of the live fish container. In other words, the excessive weight over the limit weights of 24 ton in the 20 feet container or of 30 ton in the 40 feet container may be occurred, so that it is likely to break the rules with respect to the weight restrictions of live container.

In order to fulfill the rules with respect to the weight restrictions of live container, it is necessary to reduce the total size of live fish container including the filter media. This leads to the reduction in the quantity of live fish to be transported by using the live fish container at once. Accordingly, it is hard to reduce the logistical cost with respect to the transportation of live fish.

In the use of the conventional wet-type filter media, the live fish water may be circulated due to the operation of the circulation pump in a state that the filter media is immersed in the live fish water. As a result, the filtering efficiency is relatively low so that it is necessary to increase the volume occupied by the filter media so as to obtain a sufficient filtering capability. This leads to a remarkable reduction in the space for storing live fish.

Meanwhile, a large number of live fishes are stored at high population density in the live fish water tank of the live fish container. Typically, a worker reduces the temperature of the live fish water so as to minimize the metabolism rate and the oxygen consuming rate. Since a variety of harmful ingredients resulted from live fish excrement, more particularly, ammoniac nitrogen components may be rapidly accumulated in the live fish at a high concentration, it is hard to effectively remove the harmful ingredients by only using the conventional wet-type filtering tank.

As well known that, the ammoniac nitrogen components may be presented as two types of chemical formula such as $NH_3$—N, $NH_4^+$—N which are combined with $NH_3$ or $NH_4^+$, respectively. The ammoniac nitrogen components produced by combining with the nonionic ammonia can pass through a cell-wall of fish and can damage the live fish under even low concentration such as 2 mg/L or 2 ppm. Furthermore, the ammoniac nitrogen components may oxidize to the nitrate nitrogen or the nitrite nitrogen and they exhaust the dissolved oxygen in the water.

According to the rules of the U.S. Environmental Protection Agency, the content of the harmful ingredients such as ammoniac nitrogen must be removed below 0.002 mg/L so as to store the live fish with safe and fresh condition. However, it is impossible to remove these harmful ingredients by only using the wet-type filtering tank having a relatively poor filtering capability. If a transportation time of live fish by using a live fish container becomes long, the live fish is likely to be getting a certain disease due to the harmful ingredients accumulated in the live fish, thereby resulting in the death of live fish.

Consequently, the time limit for transporting live fish by using the conventional live fish container is only two days at maximum. Accordingly, the conventional live fish container is unsuitable for transportation live fish over a long distance for a long time and therefore it is only used for transportation over a short distance for a short time. As a result, a large number of live fish must be transported not on the sea and the land but on the air. This has resulted in high cost of transporting live fish and thereby it has poor productivity.

DETAILED DESCRIPTION OF THE INVENTION

Accordingly, the present invention has been made to solve the above-mentioned problems occurring in the prior art, and a first object of the present invention is to provide a live fish container including a cargo room, which is capable of observing the rules with respect to the weight restrictions of live container even large filter media, which can further enhance the purification performance of live fish water, and which is capable of enhancing transportation capacity of live fish due to the acquisition of a sufficient space required for installing a live fish water tank in the cargo room by installing a dry-type filtering apparatus in an extra space within the live fish water tank, wherein the dry-type filtering apparatus comprises: a filtering tank case is installed above the level of the live fish water tank, a filter media is inserted into the filtering tank case and it can stay afloat in the outer space of the live fish water tank, and whereby live fish water may flow along the filter media and the filter media is not immersed in the live fish water.

Furthermore, a second object of the present invention is to provide a live fish container which is capable of removing harmful ingredients from the live fish water due to the operation of microorganisms while the live fish water uniformly injected from injection nozzles toward an upper surface of the filter media flows down through the filter media, by impregnating and cultivating a great quantity of microorganisms for removing harmful ingredients in the filter media of the dry-type filtering apparatus, and whereby the water quality of the live fish water becomes increasingly improved near that of raw water and disease or death of the live fish can prevented in advance.

Furthermore, a third object of the present invention is to provide a live fish container which is capable of enabling a foreign trader to export the live fish to or import from a far-away country by ship or train and also to transport the live fish to distance lands by automobile, and whereby the live fish can be transported over a long distance for a long time at low logistics costs, by preventing the live fish from getting a disease or being died so as to reduce the time of transporting the live fish and to secure a transporting distance at maximum.

Finally, a fourth object of the present invention is to provide a live fish container which is capable of making a fresh air injected from an air supply tube flow between fine particles of live fish water injected from an injection nozzle so as to supply the live fish water with oxygen sufficient to be consumed by microorganisms, which can remove harmful ingredients such as noxious gas and nitrogen components contained in the live fish water and thereby resulting in the water quality improvement, which is capable of maximizing the purification performance of the live fish water and of securing a sufficient dissolved oxygen during the supply of live fish water from the injection nozzle through the filter media to the live fish water tank, by installing the air supply tube for supplying fresh air at a position adjacent to the injection nozzle and by forming a plurality of air holes at the air supply tube.

To accomplish the foregoing objects, the present invention provides a live fish container including a cargo room of the type in which a door is installed at a one side of the cargo room, a driving part is installed at the other side of the cargo room, a live fish water tank and a wet-type filtering tank are installed in the cargo room, and in which a cooling apparatus is installed at the driving part as a cooling unit, characterized in that the live fish container further includes a dry-type filtering apparatus, wherein the dry-type filtering apparatus comprises:

a filtering tank case being installed above the level of the live fish water tank and extending along the longitudinal direction of the cargo room, in which the filtering tank case has an open upper end;

a filter media being inserted into the filtering tank case;

a water injecting tube being installed above the level of the filter media and running parallel to the filter media; and a plurality of injection nozzles being installed at the water injecting tube and they are spaced from each other at regular intervals in the longitudinal direction thereof;

wherein a one end of a circulation pipe extending from the live fish water tank and passing through a circulation pump is connected to a one end of the water injecting tube, and a plurality of drains for introducing live fish water running down along the filter media into the live fish water tank are formed at a bottom surface of the filtering tank case.

The filter media comprises a porous pellet filter positioned at an inner lower side of the filtering tank case, and porous fiber filters positioned above the level of the pellet filter within the filtering tank case. Microorganism for purifying the live fish water are impregnated and cultivated in the pellet filter and the fiber filters.

The air supply tube is installed above the level of the filter media and it is located at a position adjacent to the water injecting tube. A plurality of air holes are formed at regular intervals in the longitudinal direction of the air supply tube, and a one end of the air supply tube is connected to an outlet of a blower installed at the driving part.

A one end of circulation pipe extending from the wet-type filtering tank of the live fish water tanks via a circulation pump toward the dry-type filtering apparatus is connected to a one end of the water injecting tube. A one end of a pump pipe extending from the wet-type filtering tank of the live fish water tank via a pump toward the dry-type filtering apparatus is connected to the other end of the water injecting tube.

As described above, in the live fish container according to the present invention, the dry-type filtering apparatus is installed in an extra space within the live fish water tank and the filter media is inserted into the filtering tank case in a state that it can stay afloat in the outer space of the live fish water tank. Due to this structure, the filter media does not affect the live load of the live fish container so that it is possible to observe the rules with respect to the weight restrictions of live container even large filter media. Also, it can further enhance the purification performance of live fish water in comparison with the existing prior art of which the filter media is submerged in the water.

According to the present invention, although the live fish container employs only the dry-type filtering apparatus without using the conventional wet-type filtering tank, it can obtain a desired purification performance. If the live fish container employs the dry-type filtering apparatus and the conventional wet-type filtering tank, it can further enhance the purification performance.

According to the present invention, it is possible to reduce the volume of the filtering tank required to contain the wet-type filter media and the weight of water tanks at maximum. Due to this, a sufficiently large space can also be secured to be occupied by the live fish water tank within the space of a limited cargo room so that the amount of live fish to be carried can be increased, thereby enabling the transportation period and transportation distance for the live fish obtained by the live fish container to be maximized. Also, it is possible to significantly reduce the cost and time spent for the transportation of the live fish. Also, it is possible to fulfill the rules with respect to the weight restrictions of live container.

According to the present invention, it is possible to pile up a large number of filter media out of water with not having the burden. Furthermore, it is possible to remove ammonia and nitrogen components contained in the live fish water due to the operation of microorganisms so that disease or death of the live fish can prevented in advance.

According to the present invention, it enables a foreign trader to export the live fish to or import from a far-away country by ship or train and also to transport the live fish to distance lands by automobile, and whereby the live fish can be transported over a long distance for a long time at low logistics costs.

By installing the air supply tube extending from the blower together with the live fish injection nozzle, it is possible to provide microorganisms with oxygen sufficient to be consumed by them. Since air within the cargo room can be smoothly circulated due to the introduction of outer fresh air via the blower, it can provide microorganisms with cheerful surroundings to live.

BRIEF DESCRIPTION OF THE DRAWINGS

The above object and other characteristics and advantages of the present invention will become more apparent by describing in detail preferred embodiments thereof with reference to the attached drawings, in which.

BEST MODE FOR CARRYING OUT THE INVENTION

Hereinafter, the constitution and the operation of live fish container according to the present invention will be explained in more detail with reference to the accompanying drawings FIGS. 1 to 4.

Prior to proceeding to the more detailed description of the preferred embodiment according to the present invention, it should be noted that, for the sake of clarity and understanding of the invention identical components which have identical functions have been identified with identical reference numerals throughout the different views which are illustrated in each of the attached drawing Figures.

Referring to FIGS. 1 to 4, the live fish container 1 according to the present invention comprises a cargo room 2 having a door 2a, a driving part 3 installed at a rear part of the cargo room 2, a plurality of live fish water tanks 4 and a plurality of wet-type filtering tanks 5, which are alternately disposed between the door 2a and the driving part 3 within the cargo room 2. A cooling unit is additionally installed at the driving part 3. This cooling unit includes a compressor, a condenser having a radiator panel, an expansion valve and an evaporator.

Although it was shown that four live fish water tanks 4 are installed within the cargo room 2 and one wet-type filtering tanks 5 is disposed between two live fish water tanks 4, it may be apparent to one of ordinary skill in the art that the numbers and the spatial layout of the live fish water tanks 4 and the wet-type filtering tanks 5 are not limited to the particular embodiment disclosed in the attached drawings. As such, those skilled in the art will appreciate that the numbers and the spatial layout of the live fish water tanks 4 and the wet-type filtering tanks 5 can be adjusted in accordance with the size of container (20 feet or 40 feet), the kind and the carrying capacity of the live fish.

Additionally, it should be appreciated by one of ordinary skill that the spatial layout of the wet-type filtering tanks 5 may vary based on application. For example, the wet-type filtering tanks 5 can be installed at the outside of the live fish water tanks 4. Alternatively, the wet-type filtering tanks 5 can be installed on a bottom surface of the live fish water tanks 4 by laminating filter media such as sand, gravel, non-woven fabric or sponge thereon. Alternatively, it is possible to employ only a dry-type filtering apparatus 20 according to the present invention, without having the wet-type filtering tanks 5.

A water tank cover 4a is disposed at an upper portion of the live fish water tanks 4 and a filtering tank cover 5a is disposed at an upper portion of the wet-type filtering tanks 5. Since the live fish water tanks 4 and the wet-type filtering tanks 5 are contained within an enclosure of the cargo room 2, any foreign material has no chance of being introduced into the live fish water tanks 4 or the wet-type filtering tanks 5. Accordingly, it should be appreciated by one of ordinary skill that the water tank cover 4a and the filtering tank cover 5a can be omitted based on application.

Stairs 4b for a worker to enter are installed at a position adjacent to the door 2a. A wash board 7 is provided at the upper side of the live fish water tank 4 so as to prevent the live fish water from flowing over. A part of the wet-type filtering tank 5 protruding from the upper portion of the live fish water tank 4 can function as the wash board 7.

Figure 1:
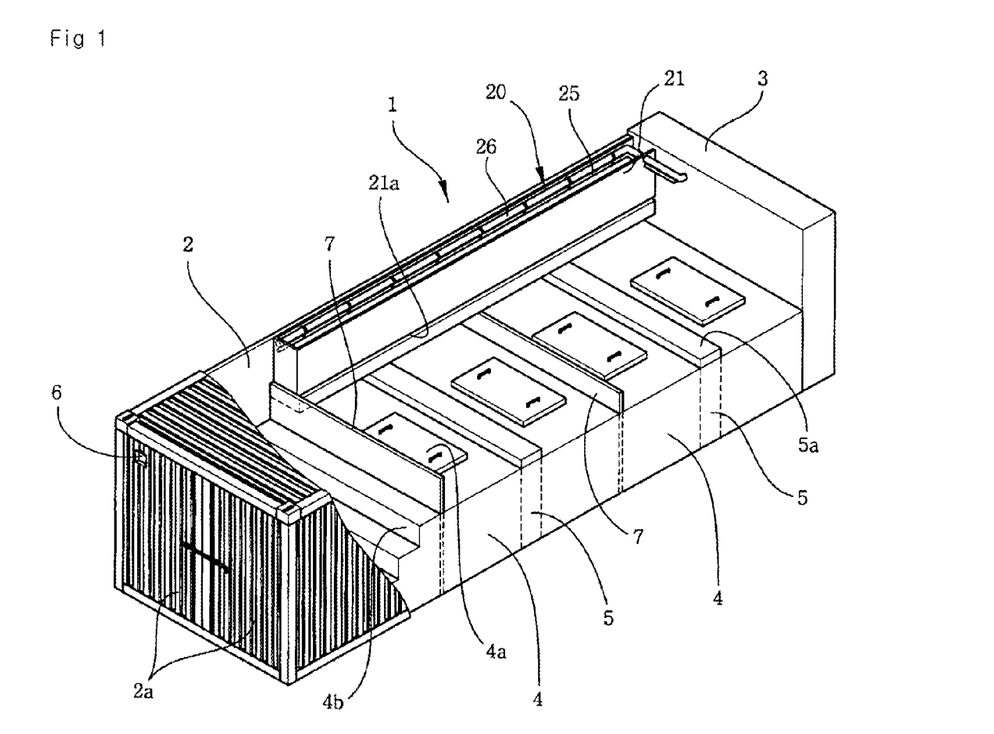
FIG. 1 is a partially cutaway perspective view of a live fish container having a wet-type filtering tank according to the present invention.
Figure 2:
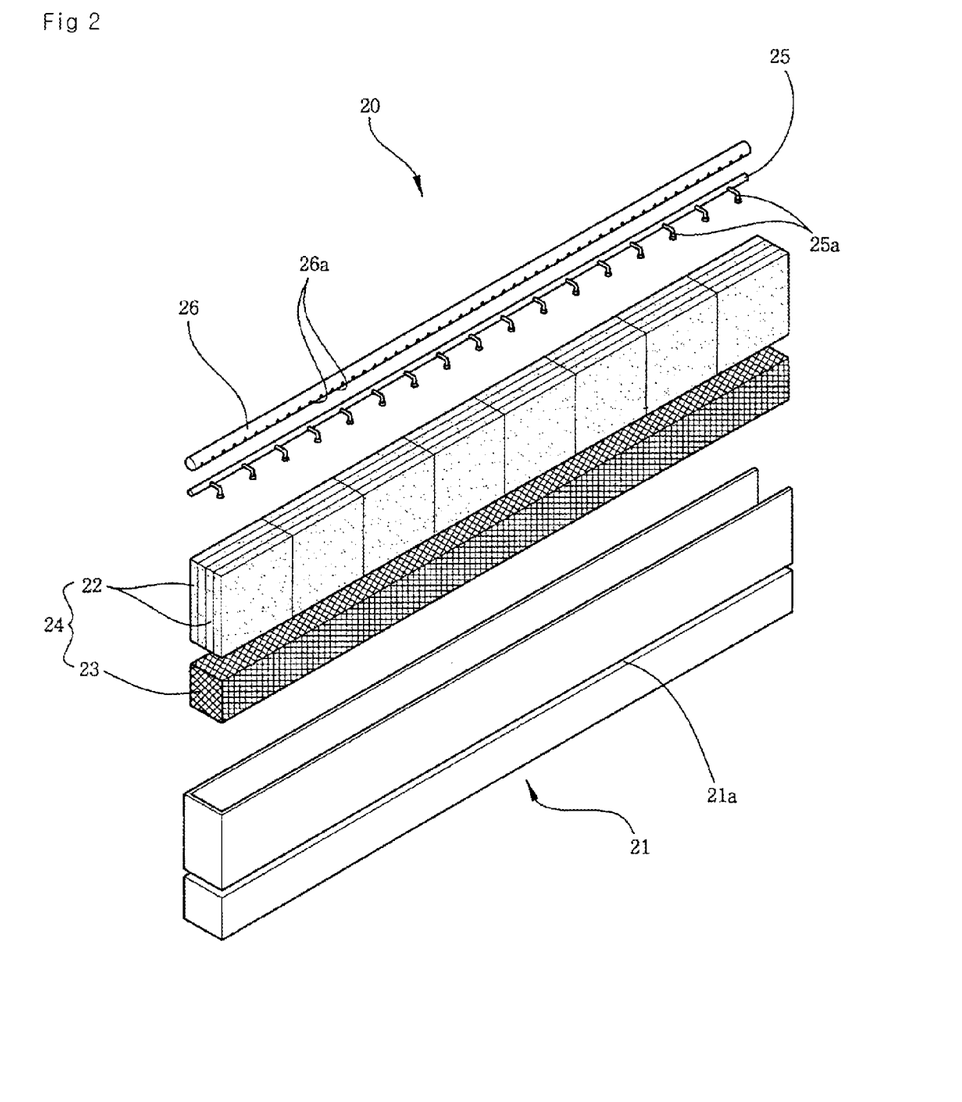
FIG. 2 is an exploded perspective view of important parts of the live fish container as shown in FIG. 1.
Figure 3:
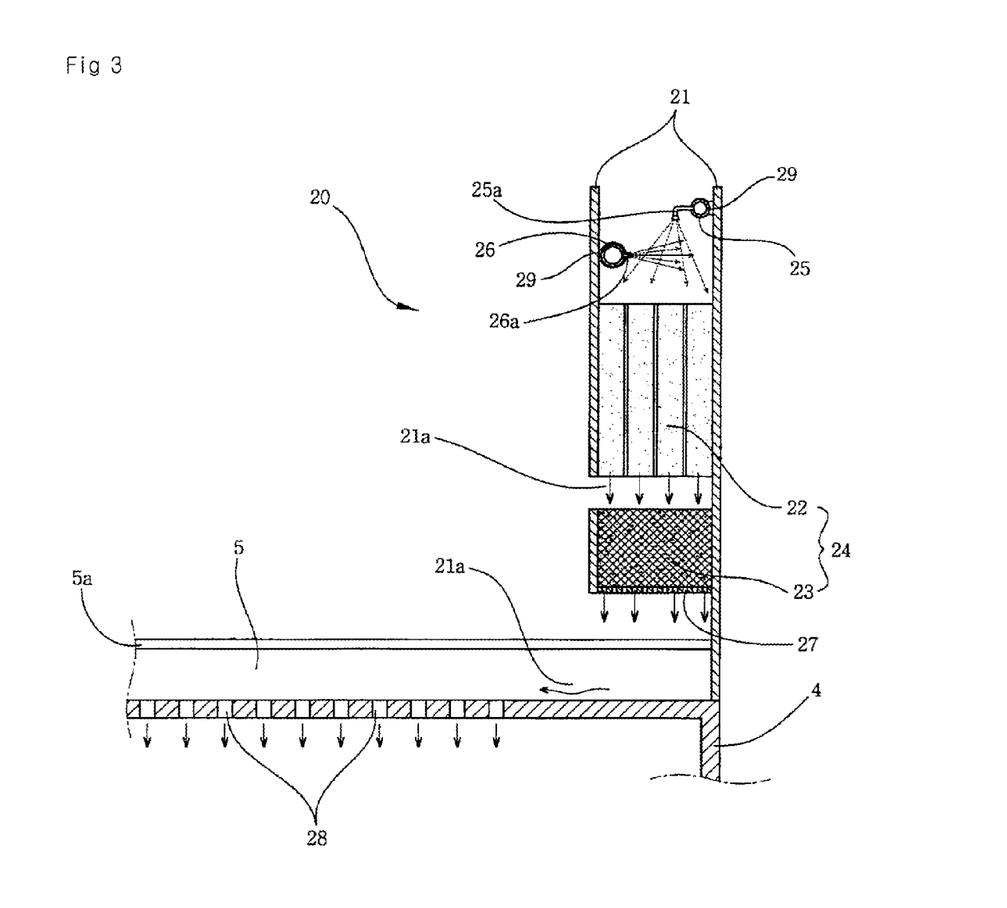
FIG. 3 is a sectional view of the important parts of the live fish container as shown in FIG. 1.

As shown in FIGS. 1 to 3, the dry-type filtering apparatus 20 according to the present invention comprises a filtering tank case 21, filter media 24 inserted into the filter tank case 21, a water injecting tube 25 and an injection nozzle 25a. The filtering tank case 21 is disposed at an upper portion of the outside of the live fish water tank 4 and it extends along the longitudinal direction of the cargo room 2. The water injecting tube 25 and the injection nozzle 25a are disposed above the level of the live fish water tank 4. In comparison with the conventional wet-type filtering apparatus, the dry-type filtering apparatus 20 according to the present invention makes the live fish water to be flowed toward the upper portion of the filter media 24 in a state that the filter media 24 is maintained not in the live fish water but in the air. As a result, the live fish water can naturally flow down between the filter media 24. Due to this, the filter media always keep the fish water therein and the live fish water may be filtered by bacteria cultured at the filter media 24.

The reason that the dry-type filtering apparatus 20 is installed at the upper portion of the outside of the live fish water tank 4, is because it is possible to obtain some space for allowing a worker move so as to load and unload the live fish. If the dry-type filtering apparatus 20 is installed in this space, there is no hindrance for installing other equipments including the live fish water tank 4. The live fish water can be re-entered into the live fish water tank 4 after passing through the dry-type filtering apparatus 20 without employing additionally flowing tubes.

Meanwhile, the filtering tank case 21 may be formed as a rectangular-shaped case of which an upper end is open for allowing the filter media 24 to be inserted and the water injecting tube 25 to be inserted. Since an outer bottom surface of the filtering tank case 21 is spaced apart from the upper side of the live fish water tank 4, the filter media 24 can stay afloat in the outer space of the live fish water tank 4. A plurality of drains 27 are formed at a bottom surface of the filtering tank case 21. The live fish water injected from the injection nozzle 25a of the water injecting tube 25 flows through the filter media 24 and the drains 27 and toward the upper side of the live fish water tank 4.

As described above, the live fish water flows along the filter media 24, which stays afloat in the outer space of the live fish water tank 4, and then it flows along the upper surface of the live fish water tank 4, and it finally flows into the live fish water tank 4. Accordingly, the filter media 24 installed in the filter tank case 21 is not deposited into the live fish water and the live fish water can be exhausted into the open space. Consequently, the residence time of the live fish water becomes longer and it is possible to enhance the purification performance with respect to the live fish water.

In the case that the drains 27 are formed at the bottom surface of the filtering tank case 21, it is preferred that the flowing path of the live fish water from the drains 27 into the live fish water tank 4 is determined on the basis of whether the wet-type filtering tank is employed or not, the installation position of the wet-type filtering tank, and the circulating direction of the live fish water. Whether the wet-type filtering tank is installed at the bottom surface of the live fish water tank 4 or not, it is preferred that the live fish water discharged through the drains 27 flows along a plurality of flowing holes 28 formed through the edge of the live fish water tank 4 and then it flows into the live fish water tank 4.

Figure 4:
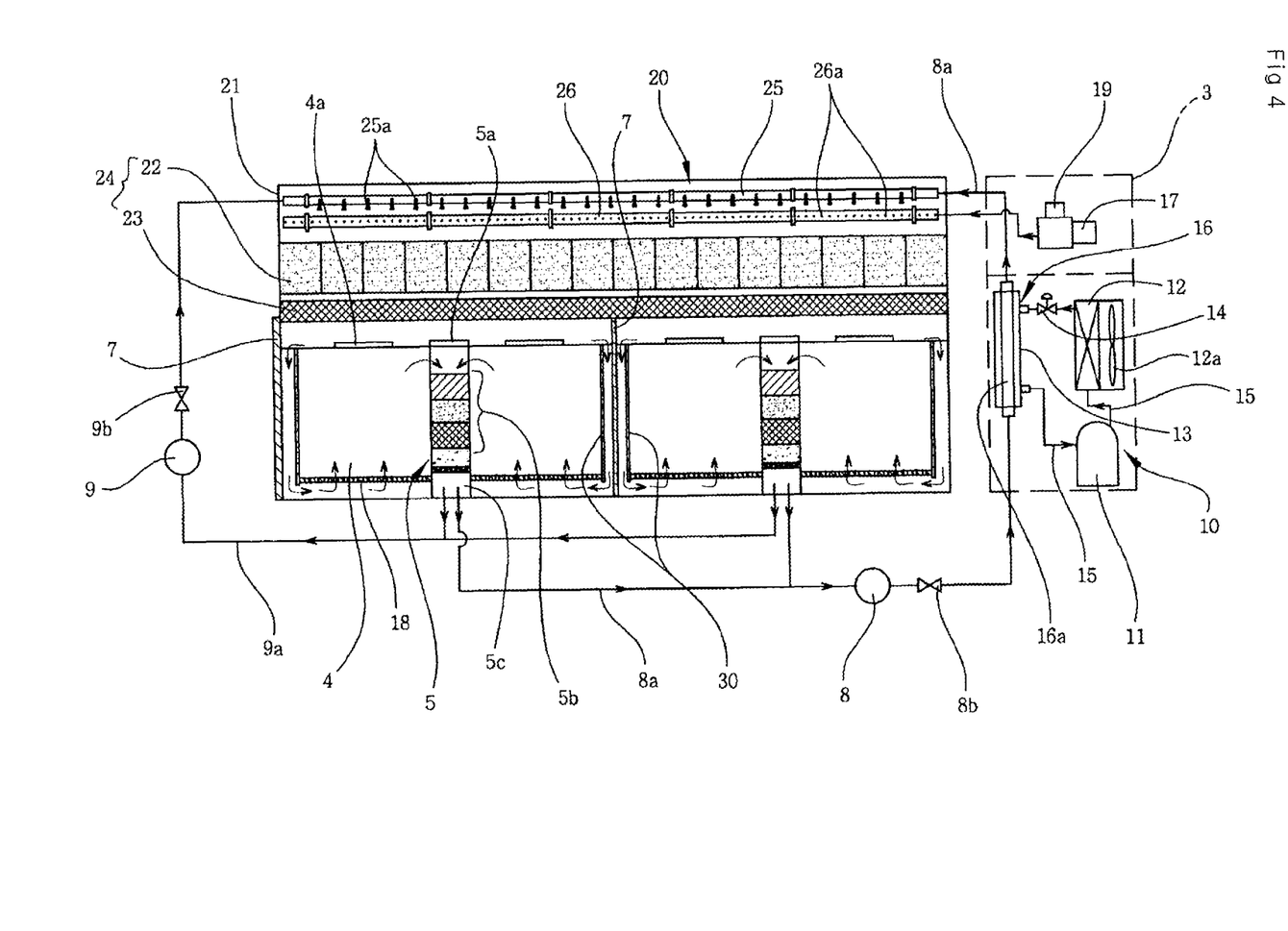
FIG. 4 shows flowing paths of the live fish water and the air with respect to the wet-type filtering tank, which is one of the important parts of the live fish container according to the present invention.

Alternatively, when the wet-type filtering tank 5 is installed at the outside of the live fish water tank 4 as shown in FIG. 4, the live fish water may flow from the upper side of the live fish water tank 4 to the upper side of the wet-type filtering tank 5. Then, the live fish water may flow through a wet-type filtering part 5b provided in the wet-type filtering tank 5 to an exhaust chamber 5c disposed below the level of the wet-type filtering part 5b. Then, the live fish water passes through the drains 27 and continuously it may be induced via the flowing holes 28 formed at the edges of the live fish water tank 4 and a plurality of flowing adjusting plates 30 to the bottom side of the live fish water tank 4. Finally, the live fish water upwardly flows through a perforated plate 18 installed at the bottom surface of the live fish water tank 4.

It should be appreciated by one of ordinary skill that additional drains can be provided at positions just below the filter media 24 within the live fish water tank 4, as needed. Due to this structure, the live fish water flowing through the filter media 24 can be directly introduced into the live fish water tank 4. It should be appreciated by one of ordinary skill, that the flowing path of the live fish water after passing through the filter media 24 of the dry-type filtering apparatus 20 is not limited the path as described above and it may vary based on application.

It may safely be said that, with respect to the filter media 24 to be applied to the dry-type filtering apparatus 20, any sort of filter media will do as long as it can remove a variety of harmful ingredients contained in the live fish water while the live fish water injected from the injection nozzle 25a flows along the filter media 24. Preferably, the filter media 24 comprises a porous material which is capable of removing the harmful ingredients by the absorption process and of impregnating and cultivating microorganism. It is preferred that the porous material must have a maximum filtering surface area.

In view of the foregoing, as shown in FIGS. 2 and 3, the filter media 24 comprises a porous pellet filter 23 positioned at an inner lower side of the filtering tank case 21, and porous fiber filters 22 positioned above the pellet filter 23 within the filtering tank case 21. It is preferred that microorganism for purifying the live fish water are impregnated and cultivated in the pellet filter 23 and the fiber filters 22.

Proper space is provided between the filter media 24, that is, the fiber filters 22 and the pellet filter 23 so as to allow the air smoothly flow there through. Preferably, oxygen can be supplied through the filter media 24 to the filtering tank case 21 so as to increase the biological filtering efficiency. For this purpose, there is an auxiliary passage at a front wall of the filtering tank case 21. Preferably, the position of the auxiliary passage corresponds to the position between the filter media 24.

The type of the fiber filter 22 may vary based on application. For example, the fiber filter 22 can be formed by laminating a non-woven fabric having a predetermined thickness or a sponge, or a thin cloth as several layers. It is the most preferred that a plurality of filter units having a plate shape are tightly contacted with each other along the longitudinal and the horizontal directions of the filtering tank case 21 so as to form the fiber filter 22, as shown in the attached drawings.

The porous pellet 23 may be formed by densely filling porous pellets comprising solid particles having a relatively small diameter into a mesh. It may safely be said that any sort of porous pellets will do as long as they comprise porous solid particles. For example, the pellet comprises a porous stone or a plastic particle. Alternatively, the pellet comprises a piece of sponge or shell. Alternatively, the pellet comprises an activated carbon.

Notable examples of microorganisms to be impregnated and cultured in the filter media 24 are aerobic nitrate microorganisms, which are so-called as Nitrosomonas and Nitrobacter.

The bacteria so-called as Nitrosomonas can function to oxidize ammonia components such as $NH_3$, $NH_4^+$ to $NO_2^-$. The bacteria so-called as Nitrobacter can function to oxidize $NO_2^-$ to $NO_3^-$, which are harmless to aquatic organisms.

The biological purifying reaction formula is as follows:

Nitrosomonas and Nitrobacter for removing ammonia and nitrogen components may be mainly used to process fresh water. A large quantity of Nitrosomonas and Nitrobacter are impregnated in the filter media 24 at a high concentration and then the impregnated filter media 24 is immersed into sea water for about 10~20 days. As a result, the microorganisms described above may be cultured and domesticated in sea water.

Nitrosomonas and Nitrobacter to be used for removing ammonia and nitrogen components contained in the live fish water are two mere microorganisms to be applied to the dry-type filtering apparatus 20 according to the present invention. It may safely be said that any sort of microorganisms will do as long as they can function to remove ammonia and nitrogen components contained in the live fish water. It is possible to use a variety of microorganisms after mixing them in accordance with the sort of materials (bacteria or other chemical substances) to be processed.

It should be appreciated by one of ordinary skill that some microorganisms such as Nitrosomonas and Nitrobacter are mixed with each other and then the mixed microorganisms can be impregnated and cultured in the filter media 24. Alternatively, It should be appreciated by one of ordinary skill, that some microorganisms such as Nitrosomonas and Nitrobacter can be independently impregnated and cultured in the filter media 24, respectively.

When aerobic microorganisms are impregnated and cultured on the filter media 24, it is preferred that oxygen sufficient to be consumed by microorganisms can be supplied by making a large quantity of air to be dissolved in the live fish water injected from the injection nozzle 25a of the water injecting tube 25. For this purpose, an air supply tube 26 is installed above the level of the filter media 24. This air supply tube 26 is located at a position adjacent to the water injecting tube 25 and is provided with a plurality of air holes 26a formed on the air supply tube 26 at regular intervals.

Now referring to FIG. 3, the air holes 26a of the air supply tube 26 are located below the injection nozzle 25a of the water injecting tube 25. Preferably, the air holes 26a are formed at a side portion of the air supply tube 26. The live fish water injected from the injection nozzle 25a of the water injecting tube 25 cross the air introduced via the air holes 26a at a right angle. Due to this, the frictional contact force between the live fish water and the air is increased and thereby a large quantity of air can be supplied into the live fish water.

It is to be understood that the spatial layout of the air supply tube 26 and the water injecting tube 25 and the contact mode between the air and the live fish water are not limited in its application to the details of construction and to the arrangements of the components set forth in the above description or illustrated in the drawings. Although the air supply tube 26 and the water injecting tube 25 are respectively fixed within the filtering tank case 21 by a bracket 29, it is possible to fix and install them by using other fixing means.

If the dry-type filtering apparatus 20 is installed in the cargo room 2 of the live fish container 1 as the best mode described above, the filter media 24 can stay afloat in the space of the live fish water tank 4 so that it cannot be immersed into the live fish water. Although large quantities of filter media 24 are used within the dry-type filtering apparatus 20, it does not affect the live load of the live fish container 1. Since the live fish water injected from the injection nozzle 25a may flow along the filter media 24, the purifying performance with respect to the live fish water is very good.

Accordingly, the container according to the present invention can provide a desired level of purification performance by only employing the dry-type filtering apparatus 20 without having the conventional wet-type filtering tank. If the dry-type filtering apparatus 20 is employed in the container together with the conventional wet-type filtering tank, it is possible to provide more excellent purification performance and to reduce the volume of the wet-type filtering media at maximum so as to obtain sufficiently large storage space for the live fish.

The quantity of live fish to be transported at once to the live fish container 1 can be highly increased in comparison with the prior art. This leads to substantial reduction of logistics costs for transporting live fish. Also, this can prevent the situation that, the live fish container 1 cannot be transported due to the weight restriction of the live fish container 1, from it occurs.

Since a variety of harmful ingredients such as ammoniac nitrogen components contained in the live fish can be effectively removed by microorganisms presented on the filter media 24, disease or death of the live fish can prevented in advance, thereby enabling the transportation period and transportation distance for the live fish obtained by the live fish container to be maximized. Since the live fish can be transported over a long distance for a long time at low logistics costs by using the live fish container ship according to the present invention, it is possible to export the live fish to or import from a far-away country by ship or train and also it is possible to transport the live fish to distance lands by automobile.

FIG. 4 shows the state that the dry-type filtering apparatus 20 according to the present invention is respectively connected to pipes for allowing the live fish flow there through and with pipes for the air within the cargo room 2. The wet-type filtering tank 5 is installed at the outside of the live fish water tank 4 and can function to purify the live fish water together with the wet-type filtering tank 5, which is one of the important parts of the live fish container according to the present invention.

As described above, it should be appreciated by one of ordinary skill that the wet-type filtering part 5b of the wet-type filtering tanks 5 can be installed on the bottom surface of the live fish water tanks 4. Alternatively, it is possible to employ only a dry-type filtering apparatus 20 according to the present invention, without having the wet-type filtering tanks 5. When the wet-type filtering tanks 5 is installed within the live fish water tanks 4, the exhaust tube of the live fish water may extend from the exhaust chamber 5c positioned at the lower end of the wet-type filtering tanks 5. When the wet-type filtering tanks 5 does not installed within the live fish water tanks 4, the exhaust tube of the live fish water may extend from the bottom surface of the live fish water tanks 4.

As shown in FIG. 4, the water injecting tube 25 of the dry-type filtering apparatus 20 is connected to a circulation pipe 8a for circulating the live fish water, which extends from the wet-type filtering tanks 5 of the live fish water tanks 4 through a circulation pump 8 toward the dry-type filtering apparatus 20. The air supply tube 26 is connected to the outlet of a blower 17 installed at the driving part 3.

The driving part 3 includes a live fish cooling apparatus 10, which is a cooling unit comprising a compressor 11, a condenser 12 having a cooling fan 12a, an expansion valve 14, an evaporator 13 and refrigerant pipes 15 for connecting them together.

The cooling apparatus 10 can be classified into two types. One type is that the evaporator 13 of the cooling unit is directly installed to the bottom surface or the side surface of the live fish water tank 4 or the wet-type filtering tank 5. In this case, the circulation pipe 8a extends via the circulation pump 8 and it is directly connected to the water injecting tube 25. Other type is that a double tube heat exchanger 16 of which a cooling tube 16a is disposed in the evaporator 13 is installed at the driving part 3, as disclosed by the prior application filed by the present applicant. In this case, the circulation pipe 8a extends via the cooling tube 16a and it is directly connected to the water injecting tube 25. Of the two the latter type of cooling apparatus 10 is better. The blower 17 of which the air supply tube 26 is connected thereto can be installed together with the cooling apparatus 10. Alternatively, the blower 17 can be installed at a space that is a ventilation chamber created at the upper side of the driving part 3.

The ventilation chamber can function to allow the chill to be introduced into the cargo room 2 in accordance with the operation of the cooling fan and to allow the air presented within the cargo room 2 to be exhausted to the outside. An exhaust port 6 is formed at a one side wall of the cargo room 2 so that the internal air of the cargo room 2 can be exhaust through the exhaust port 6 to the outside. At this time, the quantity of air to be exhausted to the outside corresponds to the quantity of air to be introduced through the air supply tube 26 into the cargo room 2 due to the operation of the blower 17.

The air to be introduced through an air inlet 19 may be supplied through the air supply tube 26 of the cargo room 2. Then, the harmful gas presented in the cargo room 2 may be forcibly exhausted to the outside by fresh air introduced from the outside so that the atmosphere of the cargo room 2 is quite agreeable. The live fish water injected by the injection nozzle 25a as fine particles may collide with the fresh air so that oxygen sufficient to be consumed by microorganisms can be obtained.

Meanwhile, as described above, the circulation pipe 8a extending from the wet-type filtering tank 5 of the live fish water tank 4 through the circulation pump 8 is connected to the one side of the water injecting tube 25. Likewise, a pump pipe 9a extending from the wet-type filtering tank 5 of the live fish water tank 4 through a pump 9 is connected to the other side of the water injecting tube 25. The injection pressure of the live fish water injected from the injection nozzle 25a of the water injecting tube 25 can be further increased due to the operation of the pump 9 and the pump pipe 9a.

If the injection pressure of the live fish water injected from the injection nozzle 25a of the water injecting tube 25 is increased, the particle size of the live fish water becomes smaller and the injection width of the live fish water can be enlarged. As a result, much more quantities of air can be dissolved into the live fish water during the injection of the live fish water. This result in generation of the sufficient oxygen required to be consumed by microorganisms. Also, it is possible to obtain the sufficient dissolved oxygen of the live fish water.

Meanwhile, opening and shutting valves 8b and 9b are installed at the circulation pipe 8a and the pump pipe 9a, respectively. These opening and shutting valves 8b and 9b are always opened during the normal operation of the live fish container 1. It is possible to control the flow of live fish water by controlling the operations of the opening and shutting valves 8b and 9b. It should be appreciated by one of ordinary skill, that the opening and shutting valves 8b and 9b can be omitted based on application.

Besides the dry-type filtering apparatus 20 installed in the cargo room 2 of the live fish container 1, an oxygen supplying device (not shown), an illumination system (not shown), a control panel for operating and controlling the live fish container 1, an inverter and a battery may be additionally installed in the cargo room 2 based on application. A unit control box having a power connector or a thermometer and so on can be installed at the driving part 3 together with the cooling apparatus 10.

The unit control box can control the operation of the live fish container 1 on the basis of the live fish's temperature measured by the thermometer and a signal inputted from a variety of sensors, by receiving an electric current via a power connector from an electric source of the trailer or the ship. When an outer electric source does not applied to the unit control box, the inverter installed in the cargo room 2 may transform a direct current power into an alternating current power by receiving an electric power generated from the battery so as to operate the live fish container 1. It should be appreciated by one of ordinary skill that such electric and electronic devices are widely known in the technical field with respect to the refrigerated container.

Although the compressor 11, the condenser 12, the expansion valve 14 and the evaporator 13 are disclosed as necessary elements to the cooling apparatus 10, some widely know mechanical parts such as a two-stage air compressor, a vibration attenuator for the compressor 11, a receiver tank, a dry filter, an oil-water separator, and an accumulator can be added to the cooling unit so as to increase the efficiency of the cooling cycle.

While the invention has been described with reference to a preferred embodiment, it will be understood by those skilled in the art that various changes may be made and equivalents may be substituted for elements thereof without departing from the scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. A live fish container comprising:
a cargo room in which a door is installed at one side of the cargo room;
a driving part installed at another side of the cargo room;
a live fish water tank and a wet-type filtering tank, both of which being installed in the cargo room; and
a cooling apparatus installed at the driving part as a cooling unit; and
a dry-type filtering apparatus including:
a filtering tank case being installed above the level of the live fish water tank and extending along the longitudinal direction of the cargo room, in which the filtering tank case has an open upper end;
a filter media being inserted into the filtering tank case;
a water injecting tube being installed above the level of the filter media and running parallel to the filter media; and
a plurality of injection nozzles being installed at the water injecting tube and being spaced apart from each other at a regular interval in the longitudinal direction thereof;
wherein one end of a circulation pipe extending from the live fish water tank and passing through a circulation pump is connected to one end of the water injecting tube, and a plurality of drains for introducing live fish water running down along the filter media into the live fish water tank are formed at a bottom surface of the filtering tank case.

2. The live fish container as claimed in claim 1, wherein the filter media comprises a porous pellet filter positioned at an inner lower side of the filtering tank case, and porous fiber filters positioned above the level of the pellet filter within the filtering tank case, in which microorganisms for purifying the live fish water are impregnated and cultivated in the pellet filter and the fiber filters.

3. The live fish container as claimed in claim 1, wherein an air supply tube is installed above the level of the filter media and is located at a position adjacent to the water injecting tube, in which a plurality of air holes are formed at regular a intervals in the longitudinal direction of the air supply tube, and one end of the air supply tube is connected to an outlet of a blower installed at the driving part.

4. The live fish container as claimed in claim 1, wherein one end of a pump pipe extending from the wet-type filtering tank of the live fish water tank via a pump toward the dry-type filtering apparatus is connected to another end of the water injecting tube.

5. The live fish container as claimed in 3, wherein one end of a pump pipe extending from the wet-type filtering tank of the live fish water tank via a pump toward the dry-type filtering apparatus is connected to another end of the water injecting tube.

6. The live fish container as claimed in claim 2, wherein an air supply tube is installed above the level of the filter media and is located at a position adjacent to the water injecting tube, in which a plurality of air holes are formed at a regular interval in the longitudinal direction of the air supply tube, and one end of the air supply tube is connected to an outlet of a blower installed at the driving part.

7. The live fish container as claimed in claim 2, wherein one end of a pump pipe extending from the wet-type filtering tank of the live fish water tank via a pump toward the dry-type filtering apparatus is connected to another end of the water injecting tube.

8. The live fish container as claimed in claim 6, one end of a pump pipe extending from the wet-type filtering tank of the live fish water tank via a pump 9 toward the dry-type filtering apparatus is connected to another end of the water injecting tube.

* * * * *